(12) United States Patent
Miller et al.

(10) Patent No.: US 9,157,306 B2
(45) Date of Patent: Oct. 13, 2015

(54) THERMALLY-ACTIVATED GELLANT FOR AN OIL OR GAS TREATMENT FLUID

(71) Applicant: HALLIBURTON ENERGY SERVICES, INC., Houston, TX (US)

(72) Inventors: Matthew L. Miller, Houston, TX (US); Jay P. Deville, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 79 days.

(21) Appl. No.: 13/895,902

(22) Filed: May 16, 2013

(65) Prior Publication Data

US 2014/0338912 A1    Nov. 20, 2014

(51) Int. Cl.
| | |
|---|---|
| *E21B 43/25* | (2006.01) |
| *C09K 8/502* | (2006.01) |
| *C09K 8/34* | (2006.01) |
| *C09K 8/565* | (2006.01) |
| *C09K 8/64* | (2006.01) |
| *C09K 8/82* | (2006.01) |
| *C08L 53/00* | (2006.01) |

(52) U.S. Cl.
CPC .................. *E21B 43/25* (2013.01); *C08L 53/00* (2013.01); *C09K 8/34* (2013.01); *C09K 8/502* (2013.01); *C09K 8/565* (2013.01); *C09K 8/64* (2013.01); *C09K 8/82* (2013.01)

(58) Field of Classification Search
CPC .......... C09K 8/502; C09K 8/34; C08L 53/00; E21B 43/25
USPC ............................................... 166/305.1, 285
See application file for complete search history.

(56) References Cited

U.S. PATENT DOCUMENTS

| | | | |
|---|---|---|---|
| 4,740,319 A * | 4/1988 | Patel et al. | 507/118 |
| 4,947,933 A | 8/1990 | Jones et al. | |
| 6,204,224 B1 * | 3/2001 | Quintero et al. | 507/123 |
| 7,351,681 B2 | 4/2008 | Reddy et al. | |
| 7,749,943 B2 * | 7/2010 | Xiang et al. | 507/122 |
| 8,002,049 B2 * | 8/2011 | Keese et al. | 175/64 |
| 8,188,014 B2 | 5/2012 | Svoboda | |
| 2007/0074869 A1 * | 4/2007 | Svoboda | 166/294 |
| 2008/0039347 A1 | 2/2008 | Welton et al. | |
| 2008/0121395 A1 | 5/2008 | Reddy et al. | |
| 2008/0146463 A1 | 6/2008 | Taylor et al. | |

OTHER PUBLICATIONS

Halliburton Energy Services, Inc., Bararesin-Vis, Halliburton Product Sheet, 2010.
Mi Swaco, A Schlumberger Co., Versapac, Mi Swaco Product Sheet, 2013.

* cited by examiner

*Primary Examiner* — Doug Hutton, Jr.
*Assistant Examiner* — Silvana Runyan
(74) *Attorney, Agent, or Firm* — McGuirewoods LLP

(57) ABSTRACT

A treatment fluid for treating a portion of a subterranean formation comprises: a base fluid, wherein the base fluid comprises a hydrocarbon liquid; and a gellant, wherein the gellant: is a polymer; and is activated at an activation temperature, wherein the thermal activation of the gellant causes the treatment fluid to become a gel. A method of treating a portion of a subterranean formation includes introducing the treatment fluid into the portion of the subterranean formation, wherein the subterranean formation is penetrated by a well, wherein at least a portion of the well has a bottomhole temperature greater than or equal to the activation temperature, and wherein the step of introducing comprises introducing the treatment fluid into the portion of the well.

18 Claims, 1 Drawing Sheet

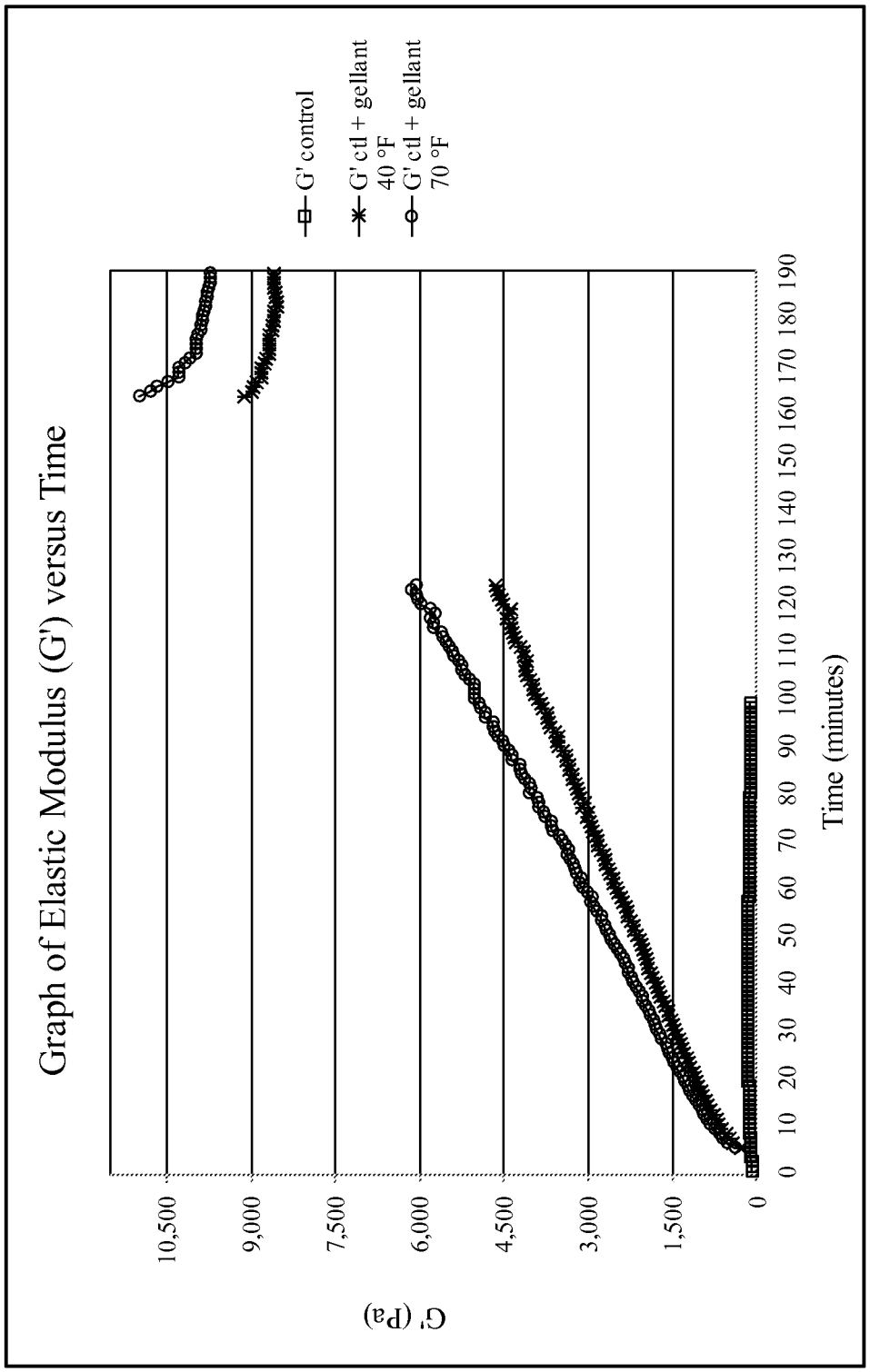

THERMALLY-ACTIVATED GELLANT FOR AN OIL OR GAS TREATMENT FLUID

TECHNICAL FIELD

Gelled treatment fluids are used in oil or gas wells for a variety of reasons. One reason is to suspend undissolved solids from settling to the bottom of the fluid. Another reason is to reduce the mixability of the gelled fluid with another fluid. Yet another reason is to help maintain the fluid in a desired location in the well.

SUMMARY

According to an embodiment, a treatment fluid for treating a portion of a subterranean formation comprises: a base fluid, wherein the base fluid comprises a hydrocarbon liquid; and a gellant, wherein the gellant: is a polymer; and is activated at an activation temperature, wherein the thermal activation of the gellant causes the treatment fluid to become a gel.

According to another embodiment, a method of treating a portion of a subterranean formation comprises: introducing a treatment fluid into the portion of the subterranean formation, wherein the treatment fluid comprises: (A) a base fluid, wherein the base fluid comprises a hydrocarbon liquid; and (B) a gellant, wherein the gellant: (i) is a polymer; and (ii) is activated at an activation temperature, wherein the thermal activation of the gellant causes the treatment fluid to become a gel, wherein the subterranean formation is penetrated by a well, wherein at least a portion of the well has a bottomhole temperature greater than or equal to the activation temperature, and wherein the step of introducing comprises introducing the treatment fluid into the portion of the well.

BRIEF DESCRIPTION OF THE FIGURES

The features and advantages of certain embodiments will be more readily appreciated when considered in conjunction with the accompanying FIGURES. The figures are not to be construed as limiting any of the preferred embodiments.

FIG. 1 is a graph of elastic modulus (G') in units of Pascals versus time in units of minutes for three different treatment fluids.

DETAILED DESCRIPTION

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, a test fluid can consists essentially of the base fluid and the gellant. The test fluid can contain other ingredients so long as the presence of the other ingredients do not materially affect the basic and novel characteristics of the claimed invention, i.e., so long as the thermal activation of the gellant causes the test fluid to become a gel.

As used herein, a "fluid" is a substance that can flow and conform to the outline of its container when the substance is tested at a temperature of 71° F. (22° C.) and a pressure of one atmosphere "atm" (0.1 megapascals "MPa"). A fluid can be a liquid or gas. A fluid can have only one phase or more than one distinct phase. A colloid is an example of a fluid having more than one distinct phase. A colloid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. There can be more than one dispersed phase of a colloid, but only one continuous phase. For example, there can be a continuous phase, which is adjacent to a first dispersed phase, and the first dispersed phase can be adjacent to a second dispersed phase. Moreover, any of the phases of a colloid can contain dissolved materials and/or undissolved solids.

A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10 minute gel strength greater than 30 lb/100 ft$^2$ (1,436 Pa) will become a gel. Alternatively, generally, a substance with a 10 minute gel strength less than 30 lb/100 ft$^2$ (1,436 Pa) will remain in a fluid state. A flat gel indicates that the gelation of the substance is not gaining much strength with time; whereas, a progressive gel indicates that the gelation of the substance is rapidly gaining strength with time. A gel can be a fragile gel. A fragile gel is a fluid that acts like a gel when allowed to remain static for a period of time (i.e., no external force is applied to the fluid) thus exhibiting good suspending properties, but can be broken into a liquid or pumpable state by applying a force to the gel. Conversely, a progressive gel may not be breakable, or a much higher force may be required to break the gel.

Another way to determine the gelation of a fluid is to measure the elastic modulus of the fluid. Elastic modulus (G') is a measure of the tendency of a substance to be deformed elastically (i.e., non-permanently) when a force is applied to it and returned to its normal shape. Elastic modulus is expressed in units of pressure, for example, Pa (Pascals) or dynes/cm$^2$. The force is normally measured in rad/sec.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain one or more annuli. Examples of an annulus include, but are not limited to: the space between the wellbore and the outside of a tubing string in an open-hole wellbore; the space between the wellbore and the outside of a casing in a cased-hole wellbore; and the space between the inside of a first tubing string and the outside of a second tubing string, such as a casing. A treatment fluid can be introduced into a well to treat on or more portions of the well or formation.

It is often desirable to treat at least a portion of a well with a treatment fluid. As used herein, a "treatment fluid" is a fluid designed and prepared to resolve a specific condition of a well or subterranean formation, such as for drilling, completion, stimulation, isolation, gravel packing, or control of reservoir gas or water. The term "treatment fluid" refers to the specific composition of the fluid as it is being introduced into a wellbore. The term "treatment" in the term "treatment fluid" does not necessarily imply any particular action by the fluid.

During drilling operations, a wellbore is formed using a drill bit. A drill string can be used to aid the drill bit in drilling through a subterranean formation to form the wellbore. The drill string can include a drilling pipe. A treatment fluid adapted for this purpose is referred to as a drilling fluid or drilling mud. The drilling fluid may be circulated downwardly through the drilling pipe, and back up the annulus between the wellbore and the outside of the drilling pipe. During well construction and completion, it is common to introduce a cement composition into a portion of an annulus in a wellbore. For example, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead.

However, cement is not always placed in every annulus of a wellbore, nor is the cement generally placed in the entire length of an annulus. Therefore, it is common for a large quantity of a drilling fluid or other fluid to remain in portions of the wellbore. The fluid can remain in one or more annuli of the wellbore for lengths in excess of hundreds of feet. Moreover, the fluid can remain in the wellbore from weeks to even years. The fluid remaining in the wellbore can become unstable. As used herein, the term "stability" means a fluid that remains homogenous for a specified time period. As used herein, the term "homogenous" means that less than 10% of undissolved particles settle out of the liquid phase of the fluid. By way of example, the majority of undissolved solids of a drilling fluid do not settle to the bottom of the column of fluid.

The concentration of solids in the fluid at a particular location in the wellbore, among other things, determines the density of the fluid at that location. Therefore, the density of the fluid containing the settled solids can be much greater than the density of the fluid upstream (i.e., at a location closer to the wellhead). The density of the fluid at each location in the wellbore plays a role in the pressure differential between the fluid and the subterranean formation. For example, the density of the fluid can create an over-balanced, under-balanced, or balanced wellbore. An over-balance is created when the amount of pressure in the wellbore exceeds the pore pressure in the formation. An under-balance is created when the amount of pressure in the wellbore is less than the amount of pore pressure in the formation. A balanced wellbore is when the amount of pressure in the wellbore equals the pore pressure in the formation (i.e., there is not a pressure differential between the wellbore and the formation). As a result of the difference in density, the balance of the wellbore can become different at one or more locations in the wellbore. For example, the lower density fluid at the top of the column of fluid may provide an underbalance, whereas the higher density of fluid towards the bottom of the column of fluid may provide an overbalance. Therefore, it is desirable to have a consistent density throughout a column of fluid to prevent differences in the balance of the wellbore.

A gellant can be added to a treatment fluid to create a gelled fluid. A gelled fluid is generally more stable compared to other non-gelled fluids. The gelled structure of the fluid can substantially inhibit or prevent the majority of undissolved solids from settling out of the fluid. Gellants can also be used in other types of treatment fluids, such as isolation fluids or thermally-insulating fluids, to help keep the fluid in a desired location in the well.

One of the problems encountered with including a gellant in a treatment fluid is that the fluid can become so gelled and viscous that the fluid is difficult or impossible to pump into the well. In order to overcome the problem of premature gelation, the gellant can be encapsulated or coated, wherein the capsule or coating dissolves or melts once placed in the wellbore. However, this leads to a more complicated system, increases costs, and the capsule or coating may not dissolve or melt sufficiently to allow the gellant to gel the fluid. Therefore, there exists a need for a treatment fluid gellant that can be used to cause the fluid to gel after introduction of the fluid into the well and allow the fluid to remain stable for an extended time.

It has been discovered a gellant that is thermally activated can be used in oil-based treatment fluids. As used herein, the term "oil-based" means a fluid containing a liquid hydrocarbon or another non-aqueous liquid as the base fluid. For a colloid, the base fluid is the continuous phase of the colloid. The gellant can be included in the treatment fluid at the surface and once the gellant reaches a depth in the wellbore of a specified temperature, the gellant can become thermally activated thereby causing the fluid to become a gel. Some of the unique advantages to the gellant is that the gellant does not become activated at most surface temperatures; the gellant can become activated after introduction into the well whereby the treatment fluid remains in a pumpable state prior to activation; the treatment fluid can cool to a temperature below the activation temperature and still remain in a gelled state; and the gellant does not need to be encapsulated or coated to delay gelation of the treatment fluid.

If any laboratory test (e.g., sag factor or gel strength) requires the step of mixing, then the treatment fluid is mixed according to the following procedures. A known volume (in units of barrels) of the base fluid is added to a mixing container and the container is then placed on a mixer base. The motor of the base is then turned on and maintained at 11,000 revolutions per minute (rpm). The gellant and any other ingredients are then added to the base fluid and mixed for at least 5 minutes. The ingredients can be added at a stated concentration of weight by volume of the treatment fluid, for example, in units of pounds per barrel of the treatment fluid. It is to be understood that any mixing is performed at ambient temperature and pressure (about 71° F. (22° C.) and about 1 atm (0.1 MPa)).

It is also to be understood that if any laboratory test (e.g., sag factor or gel strength) requires the test be performed at a specified temperature and possibly a specified pressure, then the temperature and pressure of the treatment fluid is ramped up to the specified temperature and pressure after being mixed at ambient temperature and pressure. For example, the treatment fluid can be mixed at 71° F. (22° C.) and 1 atm (0.1 MPa) and then placed into the testing apparatus and the temperature of the treatment fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the treatment fluid is ramped up to the specified temperature and possibly pressure, the treatment fluid is maintained at that temperature and pressure for the duration of the testing.

It is desirable that the treatment fluid remain stable for a desired amount of time. As used herein, "stability" testing is performed according to API 131 Recommended Practice for Laboratory Testing of Treatment Fluids, by placing the treatment fluid in a stainless steel ageing cell. The ageing cell is then pressurized with nitrogen gas to prevent the fluid from vaporizing and then placed in a hot rolling oven at a specified temperature. The container is then rolled at the specified temperature for a specified time. The ageing cell is then removed from the rolling oven and visually inspected to determine if the treatment fluid is stable (i.e., the fluid is homogenous and less than 10% of undissolved particles settle out of the base fluid).

Another desirable property of a treatment fluid is a good sag factor. As used herein, only treatment fluids that are considered "stable" after performing stability testing are tested for the "sag factor" (SF) as follows. After stability testing is performed, the specific gravity (SG) of the treatment fluid is measured at the top of the fluid and at the bottom part of the fluid in the aging cell. The sag factor is calculated using the following formula: $SF=SG_{bottom}/(SG_{bottom}+SG_{top})$. A sag factor of greater than 0.53 indicates that the fluid has a potential to sag; therefore, a sag factor of less than or equal to 0.53 is considered to be a good value.

A substance can develop gel strength. As used herein, the "initial gel strength" of a treatment fluid is measured according to API 13B-2 section 6.3, Recommended Practice for Field Testing of Oil-based Treatment fluids as follows. After the rheology testing of the substance is performed, the substance is allowed to sit in the test cell for 10 seconds (s). The motor of the viscometer is then started at 3 rpm. The maximum deflection on the dial reading is the gel strength at 10 s in units of lb/100 ft². As used herein, the "10 min gel strength" is measured as follows. After the initial gel strength test has been performed, the substance is allowed to sit in the test cell for 10 minutes (min). The motor of the viscometer is then started at 3 rpm. The maximum deflection on the dial reading is the gel strength at 10 min in units of lb/100 ft². Due to the limitations of testing equipment and the nature of a gelled fluid, the gel strength tests do not necessarily indicate that a fluid has gelled. For example, a very gelled fluid may result in gel strength readings being off scale or inaccurate due to wall slip or other factors.

As used herein, the elastic modulus (G') are determined as follows using an advanced rheometer such as an Anton-Paar MCR 501 or similar with cone and plate geometry. The treatment fluid is mixed and then placed into a test cell. The treatment fluid is tested at a specified temperature and ambient pressure (1 atmosphere). The test cell is then placed into an advanced rheometer such as an Anton-Paar MCR 501 or similar device with a cone and plate geometry. The cone is oscillated at 0.1% amplitude and 1 rad/sec frequency. The temperature is held at an initial temperature of 150° F. (66° C.) for 2 hours and then decreased over 30 minutes to 70° F. (21° C.) at ambient pressure. A fluid with a G' greater than about 500 Pa can be considered a gel.

According to an embodiment, a treatment fluid for treating a portion of a subterranean formation comprises: a base fluid, wherein the base fluid comprises a hydrocarbon liquid; and a gellant, wherein the gellant: is a polymer; and is activated at an activation temperature, wherein the thermal activation of the gellant causes the treatment fluid to become a gel.

According to another embodiment, a method of treating a portion of a subterranean formation comprises: introducing a treatment fluid into the portion of the subterranean formation, wherein the treatment fluid comprises: (A) a base fluid, wherein the base fluid comprises a hydrocarbon liquid; and (B) a gellant, wherein the gellant: (i) is a polymer; and (ii) is activated at an activation temperature, wherein the thermal activation of the gellant causes the treatment fluid to become a gel, wherein the subterranean formation is penetrated by a well, wherein at least a portion of the well has a bottomhole temperature greater than or equal to the activation temperature, and wherein the step of introducing comprises introducing the treatment fluid into the portion of the well.

The discussion of preferred embodiments regarding the treatment fluid or any ingredient in the treatment fluid, is intended to apply to the composition embodiments and the method embodiments. Any reference to the unit "gallons" means U.S. gallons.

The treatment fluid includes a base fluid. The treatment fluid can be a solution, wherein the base fluid is the solvent of the solution and the gellant is the solute, or a colloid, wherein the base fluid is the continuous phase of the treatment fluid. Any of the phases of a colloid treatment fluid can include dissolved substances or undissolved solids.

The base fluid comprises a hydrocarbon liquid. Preferably, the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, marketed by Halliburton Energy Services, Inc. The saturated hydrocarbon can be an alkane or paraffin. Preferably, the saturated hydrocarbon is a paraffin. The paraffin can be an isoalkane (isoparaffin), a linear alkane (paraffin), or a cyclic alkane (cycloparaffin). An example of an alkane is BAROID ALKANE™ base fluid, marketed by Halliburton Energy Services, Inc. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. Preferably, the unsaturated hydrocarbon is an alkene. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include ENCORE® treatment fluid and ACCOLADE® treatment fluid, marketed by Halliburton Energy Services, Inc.

The treatment fluid can further include an aqueous liquid, wherein the aqueous liquid is a dispersed phase of the treatment fluid. The aqueous liquid can be freshwater, brackish water, or brine.

The treatment fluid includes a gellant. The gellant is a polymer. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two or more polymer molecules. A cross-link between two or more polymer molecules can be formed by a direct interaction between the polymer molecules, or conventionally, by using a cross-linking agent that reacts with the polymer molecules to link the polymer molecules.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight for a copolymer can be expressed as follows:

$$\text{Avg. molecular weight} = (M.W.m_1 * RUm_1) + (M.W.m_2 * RUm_2)$$

where $M.W.m_1$ is the molecular weight of the first monomer; $RU\ m_1$ is the number of repeating units of the first monomer; $M.W.m_2$ is the molecular weight of the second monomer; and $RU\ m_2$ is the number of repeating units of the second monomer. Of course, a terpolymer would include three monomers, a tetra polymer would include four monomers, and so on.

According to an embodiment, the polymer gellant comprises a monomer residue selected from the group consisting of styrene, ethylene, propylene, butadiene, acrylates, phthalates, and combinations thereof. The polymer gellant can be a homopolymer or a copolymer. According to an embodiment, the polymer gellant is preferably a copolymer of styrene and butadiene with optional acrylate and/or phthalate functional groups. According to another embodiment, the polymer gellant is preferably a block terpolymer of styrene, substituted styrene, ethylene, and propylene, or derivatives thereof. Commercially-available examples of suitable gellants include, but are not limited to, A610, available from NoChar, Inc. in Indianapolis, Ind. and KIC-12-013, available from Kraton Performance Polymers, Inc. in Houston, Tex. It is to be understood that the polymer can comprise the monomer residues listed as well as other monomer residues not listed. It is also to be understood that the polymer can consists essentially of, or consist of, the monomer residues listed above. For example, the polymer can contain just the monomer residues listed above without additional monomer residues or functional groups being added to the polymer, for reasons such as affecting the hydrophobic or hydrophilic nature of the polymer or the gelling capability of the polymer. The polymer gellant can have a molecular weight in the range of 500,000 to 2,000,000. The polymer gellant can be water-insoluble. The polymer can also be a cross-linked polymer. According to another embodiment, the gellant is dispersible in the base fluid.

The gellant is activated at an activation temperature. The activation temperature can be a temperature greater than or equal to 100° F. (38° C.). According to another embodiment, the activation temperature is a temperature greater than or equal to 120° F. (49° C.) or greater than or equal to 140° F. (60° C.). The thermal activation of the gellant causes the treatment fluid to become a gel. The treatment fluid gel can be a progressive gel. It is to be understood that while the treatment fluid can contain other ingredients, it is the thermal activation of the gellant that is primarily or wholly responsible for causing the treatment fluid to become a gel. For example, a test fluid consisting essentially of, or consisting of, the base fluid and the gellant and in the same proportions as the treatment fluid can become a gel upon thermal activation of the gellant. Therefore, it is not necessary for the treatment fluid to include a viscosifying agent or a suspending agent. Moreover, the gellant causes the treatment fluid to become a gel due to the thermal activation of the gellant. Therefore, it is not necessary for the gellant to be encapsulated or coated in order to delay gelation of the treatment fluid.

In an embodiment, the gellant is selected and is in a sufficient concentration such that the treatment fluid is stable. According to another embodiment, the gellant is selected and is in a sufficient concentration such that the treatment fluid has a sag factor less than or equal to 0.53, preferably less than 0.5 at a temperature of at least 100° F. (38° C.) and a time of at least 5 days. According to another embodiment, the gellant is selected and is in a sufficient concentration such that the treatment fluid has a 10 minute gel strength of at least 30 lb/100 ft$^2$ (1,436 Pa) at a temperature of 100° F. (38° C.) and a time of 5 days. According to another embodiment, the gellant is selected and is in a sufficient concentration such that the treatment fluid has a G' of at least 500 Pascals (Pa), preferably at least 1,000 Pa, at an initial temperature of 150° F. (66° C.) and a time of 2 hours.

In another embodiment, the gellant is selected and is in a sufficient concentration such that the treatment fluid is stable at the portion of the well to be treated for a desired amount of time. According to another embodiment, the gellant is selected and is in a sufficient concentration such that the treatment fluid has a sag factor less than or equal to 0.53, preferably less than 0.5 at the portion of the well to be treated for a desired amount of time. According to another embodiment, the gellant is selected and is in a sufficient concentration such that the treatment fluid has a 10 minute gel strength of at least 30 lb/100 ft$^2$ at the portion of the well to be treated for a desired amount of time. According to an embodiment, the desired amount of time is the time the treatment fluid remains in the well. The desired amount of time can be a time of at least 1 month. The desired amount of time can also be a time in the range of about 1 month to about 2 years, preferably about 1 year to 5 years.

In another embodiment, the gellant is in a concentration of at least 2 pounds per barrel (ppb) of the treatment fluid. The gellant can also be in a concentration in the range of about 2 to about 10 ppb of the treatment fluid. In an embodiment, the gellant is in a concentration in the range of about 3 to about 5 ppb of the treatment fluid.

The methods include the step of introducing the treatment fluid into a portion of the subterranean formation. According to an embodiment, the subterranean formation is penetrated by a well, wherein at least a portion of the well has a bottomhole temperature greater than or equal to the activation temperature. The step of introducing can include introducing the treatment fluid into the well. The well can have a range of bottomhole temperatures. For example, the bottomhole temperature of the well can increase as the depth of the well increases. Generally, the temperature of the well increases as the well penetrates deeper into the subterranean formation away from the Earth's surface. According to an embodiment, the portion of the well having the bottomhole temperature greater than or equal to the activation temperature is the portion of the well to be treated. According to another embodiment, the portion of the well to be treated is located upstream or downstream (i.e., farther away from the wellhead) of the portion of the well having the bottomhole temperature greater than or equal to the activation temperature. The portion of the well to be treated can also have a bottomhole temperature greater than, less than, or equal to the activation temperature. Preferably, the portion of the well to be treated has a bottomhole temperature in the range of about $-5°$ F. to about $250°$ F. ($-20°$ C. to $121°$ C.). In an embodiment, the treatment fluid remains a gel even if the portion of the well to be treated has a temperature greater than or less than the activation temperature. According to yet another embodiment, the methods can further include the step of contacting the treatment fluid with a source of heat, such as a heated fluid, wherein the source of heat increases the temperature of the treatment fluid to a temperature greater than or equal to the activation temperature. This embodiment may be useful in wellbores having bottomhole temperatures less than the activation temperature (e.g., permafrost regions or offshore drilling).

The following examples are included to illustrate possible wellbore environments and methods of using the treatment fluid. The following examples are not intended to limit the scope of the invention, but are provided for illustration purposes only. The treatment fluid is introduced into the well. The temperature at the wellhead can be less than the activation temperature. In this manner, the treatment fluid is not a gel and will be in a pumpable state. The treatment fluid can flow through the wellbore in one or more locations. A portion of the well has a bottomhole temperature greater than or equal to the activation temperature. When the treatment fluid reaches this portion of the well, the temperature of the fluid can increase to the bottomhole temperature at that portion of the well. The gellant is then thermally activated such that the treatment fluid becomes a gel. The treatment fluid can remain in that portion of the well or flow into a different portion of the well.

At certain temperatures, for example above $250°$ F. and depending on the concentration of the gellant, the treatment fluid can experience an undesirable decrease in viscosity. The decrease in viscosity may be sufficient such that the treatment fluid loses some or all of its gel structure. Therefore, according to another example, the treatment fluid can be introduced into the well and reach a portion of the well having a temperature greater than the activation temperature. The gellant is thermally activated prior to reaching this portion and the fluid becomes a gel. The viscosity of the fluid can decrease to an undesirable value at the higher temperature location. In this instance, the fluid can be circulated back up an annulus in the wellbore. As the fluid travels upstream in a direction towards the wellhead, then the bottomhole temperature in the well decreases and the fluid will cool. The fluid can cool to a temperature wherein the undesired viscosity drop is no longer present and the fluid is a gel again. The fluid can then be maintained in the cooler portions of the well and be used to treat one or more of those portions of the well. As mentioned above, one of the novel benefits to the gellant is that the fluid will remain a gelled fluid even if the treatment fluid is used to treat a portion of the well that has a bottomhole temperature less than the activation temperature. In other words, once the gellant is thermally activated, the fluid does not have to remain at that temperature, but can be used at a lower temperature and still remain a gel. For example, if the activation temperature is $140°$ F. ($60°$ C.), then the gellant will be thermally activated when the fluid reaches that temperature and cause the fluid to become a gel. Then, if the fluid is cooled to a temperature of $71°$ F. ($22°$ C.), the fluid will still remain a gel.

Without being limited by theory, it is believed that the gellant causes the fluid to become a gel because when the fluid reaches the activation temperature, the cross-linked polymeric network of the gellant loosens such that the gellant polymer can imbibe the base fluid into the polymer matrix. The polymer can then swell as the polymer imbibes the base fluid, thus causing gelation of the fluid. One of ordinary skill in the art can select the monomer residues and the concentration of the gellant based on the pre-determined bottomhole temperatures of the portion of the well to be treated and the portions of the well the fluid will flow through.

The treatment fluid can be, without limitation, a drilling fluid, a packer fluid, a completion fluid, a spacer fluid, a work-over fluid, or a thermally-insulating fluid. The treatment fluid can be used as a drilling fluid, wherein the drilling fluid can remain in a portion of the well after drilling. The treatment fluid can be introduced prior to or after a second treatment fluid. The second treatment fluid can be, without limitation, a spacer fluid or a cement composition. If used before a cement composition, then one of the advantages to the gelled treatment fluid is that the gelled fluid will not easily mix with the cement composition. The treatment fluid can also be used in areas where thermal insulation is desired. These operations can include steam injection techniques, where it is desirable to prevent loss of heat from the wellbore into the surrounding subterranean formation. According to this example, the gelled treatment fluid can remain in the portion of the wellbore where the steam injection is to be performed. The oil-based fluid can function as a thermal insulator and the gelled structure of the fluid can ensure that the fluid remains in the desired location in the well. The gelled treatment fluid used as a thermally-insulating fluid can also be used to inhibit or prevent heat flow from the subterranean formation into the wellbore.

The treatment fluid can be introduced into the portion of the well as a pill. According to this embodiment, a first fluid is introduced into the well, the treatment fluid is then introduced into the well, and then a second fluid is introduced into the well. Of course, the treatment fluid can be introduced into the well in any known method to those of ordinary skill in the art based on the desired wellbore operation to be performed.

The treatment fluid can further include one or more additives. The additives can be any additive commonly used in treatment fluids for the wellbore operation to be performed. By way of example, a drilling fluid commonly includes a weighting agent. Examples of additives include, but are not limited to, a weighting agent, a fluid loss additive, a friction reducer, a light-weight additive, a defoaming agent, elastomers, a mechanical property enhancing additive, a lost-circulation material, a filtration-control additive, a gas migration control additive, a thixotropic additive, a viscosifying additive, thermal insulating particles, and combinations thereof.

According to the method embodiments, the methods include the step of introducing the treatment fluid into at least a portion of a subterranean formation. The step of introducing the treatment fluid can be for the purpose of drilling a wellbore, completing the wellbore, stimulating the wellbore, or performing a work-over on the wellbore. The treatment fluid can be in a pumpable state before and during introduction into the subterranean formation. The treatment fluid can form a gel after introduction into the subterranean formation. The well can be an oil, gas, or water production well, an injection well, or a geothermal well. The well penetrating the subterranean formation can include an annulus. The step of introducing the treatment fluid can include introducing the treatment fluid into a portion of the annulus. The treatment fluid can be introduced into one or more annuli. The annuli can be located in the space between two tubing strings or the space between a tubing string, such as a casing and the wall of the wellbore. The treatment fluid can also penetrate some distance into the subterranean formation. The treatment fluid can also be introduced in one or more annuli at a location above or below a cement composition or other treatment fluid, such as a spacer fluid.

The methods can also further include the step of introducing a cement composition into the well, wherein the step of introducing the cement composition is performed before or after the step of introducing the treatment fluid. As used herein, a "cement composition" is a mixture of at least cement and water, and possibly additives. As used herein, the term "cement" means an initially dry substance that, in the presence of water, acts as a binder to bind other materials together. An example of cement is Portland cement. The step of introducing the cement composition can be for the purpose of at least one of the following: well completion; foam cementing; primary or secondary cementing operations; well-plugging; and gravel packing. The cement composition can be in a pumpable state before and during introduction into the well.

The method embodiments can also include the step of allowing the cement composition to set. The step of allowing can be performed after the step of introducing the cement composition into the subterranean formation. The methods can include the additional steps of perforating, fracturing, or performing an acidizing treatment, after the step of introducing the treatment fluid.

Examples

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a treatment fluid is expressed as pounds per barrel of the treatment fluid (abbreviated as "ppb").

Each of the treatment fluids were mixed and tested according to the procedure for the specific test as described in The Detailed Description section above. Each treatment fluid had a density of 11.83 pounds per gallon (1.42 kilograms per liter "kg/L") and contained at least the following ingredients: ENCORE® internal olefin based drilling fluid is the liquid hydrocarbon base fluid; and a gellant of either A610, available from NoChar, Inc. in Indianapolis, Ind. or KIC-12-013, available from Kraton Performance Polymers, Inc. in Houston, Tex. at a concentration of 3 ppb (12 kilograms per cubic meter "kg/m$^3$") or 4 ppb (16 kg/m$^3$).

Table 1 contains initial and 10 min gel strengths in units of lb/100 ft$^2$ for the treatment fluids. Initial and 10 minute gel strength tests were conducted at a temperature of 71° F. (21.7° C.) for 0, 1, 2, 4, and 21 hours (hr). The gellant was in a concentration at 3 ppb (12 kg/m$^3$) of the treatment fluid.

TABLE 1

| Gel Strength | KIC-12-013 | | | | | A610 | | | | |
|---|---|---|---|---|---|---|---|---|---|---|
| | 0 hr | 1 hr | 2 hr | 4 hr | 21 hr | 0 hr | 1 hr | 2 hr | 4 hr | 21 hr |
| 10 s | 10.5 | 11.5 | 14 | 12.5 | 11 | 11 | 12 | 12 | 13 | 11 |
| 10 min | 22 | 26 | 29 | 27 | 24 | 24 | 26 | 26 | 26 | 24 |

As can be seen in Table 1, at room temperature, none of the treatment fluids had a 10 min gel strength greater than 30 lb/100 ft$^2$. This indicates that none of the treatment fluids became a gel. Moreover, this illustrates that the activation temperature of the gellant is greater than 71° F. (22° C.).

Table 2 contains stability, sag factor, and specific gravity (SG) data for three of the treatment fluids after static aging for 16 hours at a temperature of 150° F. (66° C.). Each of the fluids were then either heated or cooled to the temperature shown in Table 2 after static aging. It should be noted that only the treatment fluids that were considered "stable" were tested for the sag factor. As can be seen in Table 2, each of the stable treatment fluids had a sag factor of less than 0.53. This indicates that the fluid will remain stable and the undissolved solids will remain suspended in the fluid.

TABLE 2

| Temperature | 70° F. | 150° F. | 150° F. | 190° F. | 190° F. |
|---|---|---|---|---|---|
| Time | 12 days | 12 days | 12 days | 5 days | 5 days |
| Conc. of gellant | 3 ppb | 3 ppb | 4 ppb | 3 ppb | 4 ppb |
| Stability | Stable | Stable | Stable | Stable | Stable |
| Sag Factor | 0.507 | 0.520 | 0.508 | 0.486 | 0.496 |
| SG top | 1.49 | 1.44 | 1.47 | 1.46 | 1.43 |
| SG bottom | 1.53 | 1.56 | 1.52 | 1.38 | 1.41 |

FIG. 1 is a graph of elastic modulus (G') in units of Pascals (Pa) versus time in units of minutes (min) for three different treatment fluids. The control treatment fluid did not contain a gellant. The other treatment fluids included a gellant of KIC-12-013 at a concentration of 3 ppb (12 kg/m$^3$) of the treatment fluid. At time 0, each of the treatment fluids had been ramped up to a temperature of 150° F. (66° C.) and held at that temperature for 120 minutes (2 hours). At 2 hours, one of the treatment fluids including the gellant was cooled to a temperature of 70° F. (21° C.) and the other treatment fluid including the gellant was cooled to a temperature of 40° F. (4° C.). Measurements were not taken while the treatment fluids cooled to a temperature of 70° F. or 40° F. (21° C. or 4° C.). After the two fluids cooled, measurements were taken for the fluids at a temperature of 70° F. or 40° F. (21° C. or 4° C.), respectively. Measurements were not taken for the control fluid after a time of 100 minutes because that fluid never gelled. As can be seen in FIG. 1, the treatment fluids containing the gellant had an elastic modulus (G') more than 40 times greater than the control fluid at a time of 100 minutes. This indicates that the addition of the gellant and the activation of the gellant at the activation temperature caused gelation of the fluids. Moreover, as can be seen for the treatment fluids containing the gellant, the fluid remained a gel even though the temperature of the treatment fluid was lowered to a temperature below the activation temperature. Specifically, the elastic modulus was approximately 11,000 Pascals (Pa) at a temperature of 70° F. (21° C.) versus approximately 6,000 Pa at a temperature of 150° F. (66° C.), and about 9,000 Pa at a temperature of 40° F. (4° C.) versus about 4,500 Pa at 150° F. (66° C.). This indicates that once thermally activated, the gellant still functions as a gel causing gelation to the base fluid despite having a temperature lower than the activation temperature.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a subterranean formation comprising:
    introducing a treatment fluid into the portion of the subterranean formation, wherein the treatment fluid comprises:
        (A) a base fluid, wherein the base fluid comprises a hydrocarbon liquid; and
        (B) a gellant, wherein the gellant:
            (i) is a polymer, and wherein the gellant has a molecular weight in the range of 500,000 to 2,000,000; and
            (ii) is activated at an activation temperature of between 100° F. and 140° F., wherein the thermal activation of the gellant causes the treatment fluid to become a gel,
    wherein the subterranean formation is penetrated by a well, wherein at least a portion of the well has a bottomhole temperature greater than or equal to the activation temperature, and wherein the step of introducing comprises introducing the treatment fluid into the portion of the well and wherein the treatment fluid remains a gel at a temperature below the activation temperature once the gellant is activated.

2. The method according to claim 1, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof.

3. The method according to claim 1, wherein the gellant is dispersible in the base fluid.

4. The method according to claim 1, wherein the activation temperature is a temperature greater than or equal to 100° F.

5. The method according to claim 1, wherein the gellant is selected and is in a sufficient concentration such that the treatment fluid is stable.

6. The method according to claim 1, wherein the gellant is selected and is in a sufficient concentration such that the treatment fluid has a sag factor less than or equal to 0.53 at a temperature of at least 100° F. and a time of at least 5 days.

7. The method according to claim 1, wherein the gellant is selected and is in a sufficient concentration such that the treatment fluid has a 10 minute gel strength of at least 30 lb/100 ft$^2$ at a temperature of 100° F. and a time of 5 days.

8. The method according to claim 1, wherein the gellant is selected and is in a sufficient concentration such that the treatment fluid has a sag factor less than or equal to 0.53 at the portion of the well to be treated for a desired amount of time.

9. The method according to claim 8, wherein the desired amount of time is the time the treatment fluid remains in the well.

10. The method according to claim 1, wherein the gellant is in a concentration in the range of about 2 to about 10 pounds per barrel of the treatment fluid.

11. The method according to claim 1, wherein the portion of the well having the bottomhole temperature greater than or equal to the activation temperature is the portion of the well to be treated.

12. The method according to claim 1, wherein the portion of the well to be treated is located upstream or downstream of the portion of the well having the bottomhole temperature greater than or equal to the activation temperature.

13. The method according to claim 1, wherein the treatment fluid remains a gel even if the portion of the well to be treated has a temperature greater than or less than the activation temperature.

14. The method according to claim 1, wherein the treatment fluid is a drilling fluid, a packer fluid, a completion fluid, a spacer fluid, a work-over fluid, or a thermally-insulating fluid.

15. The method according to claim 1, wherein the treatment fluid is introduced into the portion of the well as a pill.

16. The method according to claim 1, wherein the treatment fluid further comprises one or more additives, wherein the one or more additives are selected from the group consisting of a weighting agent, a fluid loss additive, a friction reducer, a light-weight additive, a defoaming agent, elastomers, a mechanical property enhancing additive, a lost-circulation material, a filtration-control additive, a gas migration control additive, a thixotropic additive, a viscosifying additive, thermal insulating particles, and combinations thereof.

17. The method according to claim 1, wherein the treatment fluid forms a gel after introduction into the portion of the subterranean formation.

18. A method of treating a portion of a subterranean formation comprising:
introducing a treatment fluid into the portion of the subterranean formation, wherein the treatment fluid comprises:
(A) a base fluid, wherein the base fluid comprises a hydrocarbon liquid; and
(B) a gellant, wherein the gellant:
  (i) is a polymer, wherein the gellant comprises a monomer residue selected from the group consisting of styrene, substituted styrene, ethylene, propylene, butadiene, acrylates, phthalates, or derivatives of the foregoing, and combinations thereof; and
  (ii) is activated at an activation temperature of between 100° F. and 140° F., wherein the thermal activation of the gellant causes the treatment fluid to become a gel and wherein the treatment fluid remains a gel at a temperature below the activation temperature, wherein the subterranean formation is penetrated by a well, wherein at least a portion of the well has a bottomhole temperature greater than or equal to the activation temperature, and wherein the step of introducing comprises introducing the treatment fluid into the portion of the well.

* * * * *